United States Patent
Rehmann et al.

(10) Patent No.: US 6,921,275 B2
(45) Date of Patent: Jul. 26, 2005

(54) PLUG-IN DEVICE

(75) Inventors: Wolfgang Rehmann, Asperg (DE); Bernd Kuenzl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,893

(22) PCT Filed: Feb. 21, 2002

(86) PCT No.: PCT/DE02/00642
§ 371 (c)(1),
(2), (4) Date: Oct. 17, 2002

(87) PCT Pub. No.: WO02/066932
PCT Pub. Date: Aug. 29, 2002

(65) Prior Publication Data
US 2003/0143887 A1 Jul. 31, 2003

(30) Foreign Application Priority Data
Feb. 21, 2001 (DE) .......................................... 101 08 199

(51) Int. Cl.⁷ ........................................... H01R 13/625
(52) U.S. Cl. ..................................................... 439/333
(58) Field of Search ................................ 439/333, 353, 439/354

(56) References Cited

U.S. PATENT DOCUMENTS

| | | | |
|---|---|---|---|
| 5,254,014 A | * | 10/1993 | Yagi et al. ................... 439/353 |
| 5,799,987 A | | 9/1998 | Sampson |
| 6,179,103 B1 | * | 1/2001 | Meyer ....................... 191/12 R |

FOREIGN PATENT DOCUMENTS

| | | |
|---|---|---|
| DE | 196 07 986 A1 | 9/1997 |
| DE | 199 63 912 C1 | 6/2001 |
| EP | 0 737 847 A | 10/1996 |

* cited by examiner

*Primary Examiner*—Phuong Dinh
(74) *Attorney, Agent, or Firm*—Michael J. Striker

(57) ABSTRACT

A plug-in device according to the prior art has a spring arm, which presses a knob of the unit plug (3) into a cutout of the socket part. This can lead to a mechanical failure of the spring arm. A plug-in device (1) according to the invention has a knob (9), which is disposed on an elastic part of the unit plug and in the connected state, is held in the cutout (11) of the socket part (5) without external force. The unit plug is locked into the socket rotation of the unit plug (3) to a position where a bump (9) snaps into the cutout (11).

7 Claims, 2 Drawing Sheets

PLUG-IN DEVICE

BACKGROUND OF THE INVENTION

The invention is based on a plug-in device.

The application DE 199 63 912.4-34 has disclosed a plug-in device with a unit plug and a socket part in which the unit plug has a knob that is disposed in a cutout of the socket part. Either a spring or a spring tab is required in order to secure the unit plug in the socket part.

DE 196 07 986 A1 has disclosed a tube coupling for two parts, where one part has a knob, which, in the connected state, is disposed in a cutout of the other part. The socket part has a spring, which presses the knob into the cutout. This spring is a bar that is stressed on one end and can therefore easily become mechanically fatigued.

SUMMARY OF THE INVENTION

The plug-in device according to the invention, has the advantage over the prior art that through simple means, it produces a secure plug-in device and an axial tolerance compensation.

Advantageous modifications and improvements of the plug-in device mentioned in claim 1 are possible by means of the steps taken in the dependent claims.

It is advantageous if a spring part is a bar, which is claimed at both ends, which does not become mechanically fatigued as quickly.

It is advantageous if a groove of a unit plug and a projection of a socket part constitute a bayonet connection because this produces an additional securing in the radial direction.

In a likewise advantageous fashion, a knob of the unit plug and a cutout of the socket part can constitute a detent connection. The knob and the cutout can also be advantageously embodied so that they constitute a clamped connection.

BRIEF DESCRIPTION OF THE DRAWINGS

An exemplary embodiment of the invention is shown in a simplified fashion in the drawings and will be explained in detail in the description that follows.

DETAILED DESCRIPTION OF THE PREFERRED EMBODIMENTS

Figure 1:
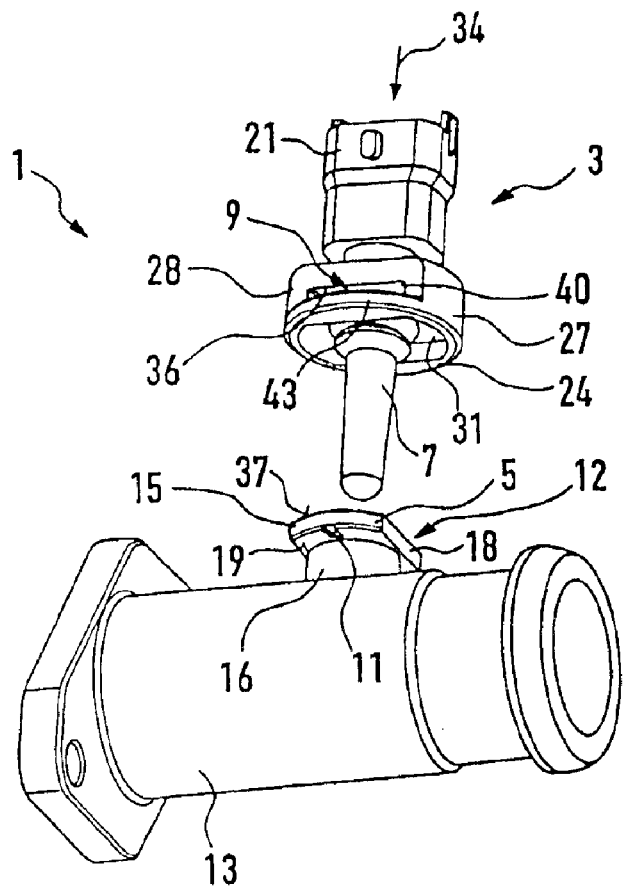
FIG. 1 shows a unit plug and a socket part in the disconnected state.

FIG. 1 shows a plug-in device 1 according to the invention in the disconnected state, which is comprised of a unit plug 3 and a socket part 5.

The e.g. plastic socket part 5 is for example a fitting 12, which is attached to a tube 13. The tube 13 can also be a container 13. The tube 13 contains a medium whose parameters, e.g. temperature, pressure, or volumetric flow, are detected by a sensor. For example, the socket part 5 is constructed as follows. The fitting 12 is comprised, for example, of a receiving tube 16, which is disposed perpendicular to the tube 13 and whose axial end has a projection 15 perpendicular to an axial direction of the receiving tube 16. The projection 15 has an external circumference line that is approximately round or curved, which has a flattened region 18 on two opposite sides. On at least one side of the projection 15 oriented away from the unit plug 5, an underside 19, there is at least one cutout 11.

The e.g. plastic unit plug 3 contains, for example, a sensor for detecting at least one parameter, which has a temperature sensor 7, for example, at its one end. A plug receptacle 21 on the unit plug 3, which is embodied for example as elongated, has, for example, external electrical plug contacts.

Around the unit plug 3, there is a ring 24, which encompasses an annular opening 31 and is connected to the unit plug 3 at a first connecting point 27 and a second connecting point 28. The angular connecting points 27, 28 extend approximately parallel to an axial direction 34 of the unit plug 3. The sections of the ring 24 between the connecting points 27, 28 are embodied as flexible and constitute a spring part 43. The spring part 43 constitutes a bent bar that is clamped in place at both ends.

The form of the annular opening 31 corresponds approximately to the external form of the projection 15 so that when being connected in the axial direction 34, the unit plug 3 is guided by the socket part 5 and can only be inserted in a particular position. The unit plug 3 comes to rest with a contact surface 36 directly against a contact surface 37 of the socket part 5.

Above the ring 24 and between the first connecting point 27 and the second connecting point 28, the unit plug 3 has a groove 40, for example embodied as an open cutout, into which the projection 15 travels upon rotation of the unit plug 3 or tube 13 so that it protrudes partially into the groove 40 and produces a bayonet connection.

Figure 2:
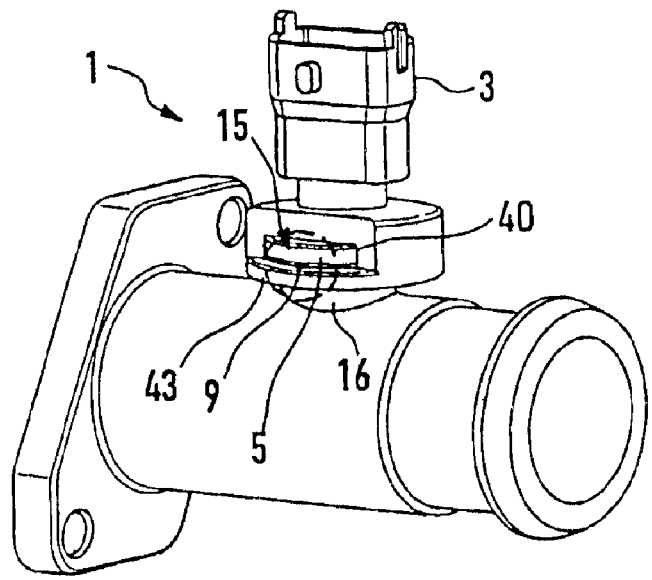
FIG. 2 shows a plug-in device according to the invention, in the connected state.
Figure 3:
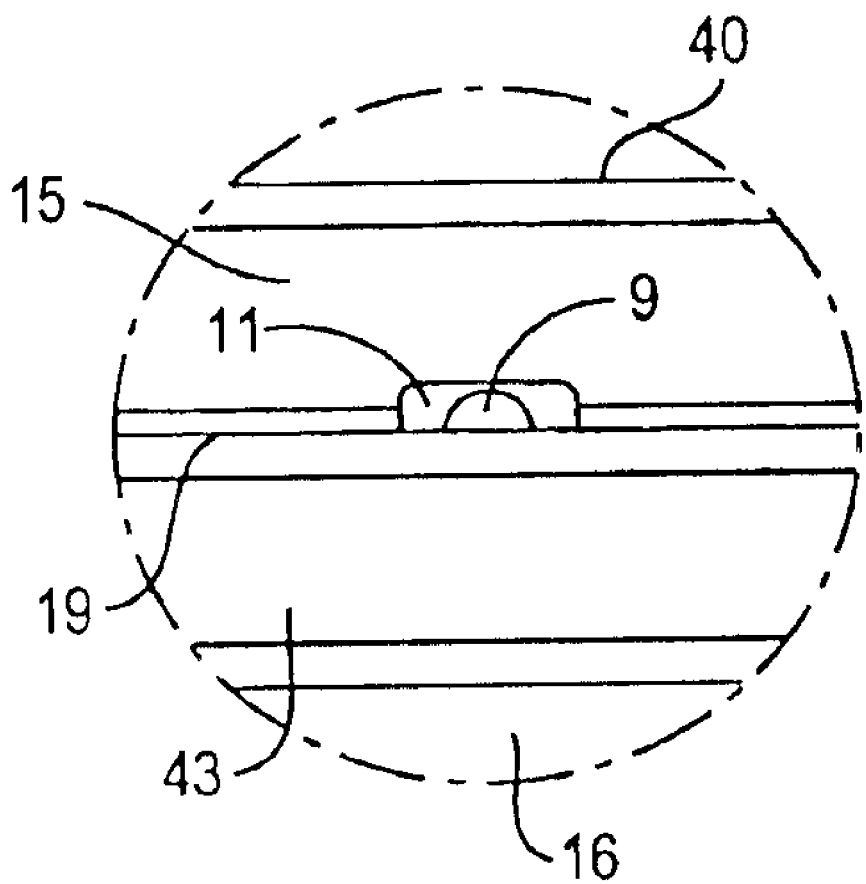
FIG. 3 shows a detail of the device in the connected state.

FIG. 2 shows a plug-in device 1 according to the invention, in the connected state.

At least one knob 9 is disposed on the spring part 43, for example in the center. In the connected state, the knob 9 is disposed in the cutout 11 and the projection 15 protrudes at least partially out from the groove 40 and rests at least partially against the spring part 43.

When being installed into the socket part 5, the unit plug 3 is turned until the knob 9 engages in detent fashion in the cutout 11, i.e. the knob 9 and the cutout 11 constitute a detent connection. In this case, the spring part 43 is bent in the installation direction because the knob 9 rests against the underside 19 of the projection 15 and a height of the groove 40 in the axial direction 34 corresponds approximately to the height of the projection 15 in the axial direction 34. When the knob 9 is disposed in the cutout 11, the spring part 43 springs back and secures the knob 9 in the cutout.

In so doing, the spring part 43 can either exert a force or exert no force on the knob 9 in the cutout 11.

The cutout 11 and the knob 9 can also be embodied so that they constitute a clamped connection, for example by means of a frictional engagement.

The unit plug 3 is thus secured against rotation in the socket part 5 and is consequently also axially secured.

The groove 40 and the projection 15 can also be embodied as wedge-shaped so that they constitute a clamped connection.

What is claimed is:

1. A plug-in device, in particular for a sensor, with a unit plug and with a socket part, said socket part having an opening into which the unit plug can be reversibly inserted, wherein the unit plug has at least one knob, wherein the at least one knob, when the unit plug is inserted into the socket part, is disposed in a cutout in the socket part and is held in the cutout by a spring part, wherein the knob (9) is disposed on an elastic spring part (43) of the unit plug (3), wherein the spring part (43) is a bar that is clamped in place at both ends, wherein the unit plug (3) has a groove (40) and wherein the groove (40) is formed onto the unit plug (3) by means of a ring (24), which encompasses the unit plug (3) and is connected to the unit plug (3) by means of two connecting points (27, 28).

2. The plug-in device according to claim 1, wherein the socket part (5) has a projection (15), and wherein the groove (40) and the projection (15) constitute a bayonet connection.

3. The plug-in device according to claim 1, wherein the knob (9) and the cutout (11) constitute a detent connection.

4. The plug-in device according to claim 1, wherein the knob (9) and the cutout (11) constitute a clamped connection.

5. The plug-in device according to claim 1, wherein the knob (9) is disposed on the spring part (43).

6. The plug-in device according to claim 1, wherein in the connected state, the spring part (43) exerts a force on the knob (9) in the cutout (11).

7. The plug-in device according to claim 1, wherein in the connected state, the spring part (43) exerts no force on the knob (9) in the cutout (11).

* * * * *